(12) United States Patent
 Iida et al.

(10) Patent No.: US 11,813,710 B2
(45) Date of Patent: Nov. 14, 2023

(54) DUST COLLECTION SYSTEM FOR POWER TOOL

(71) Applicant: MAKITA CORPORATION, Anjo (JP)

(72) Inventors: Hitoshi Iida, Anjo (JP); Masanori Furusawa, Anjo (JP); Kei Watanabe, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 17/734,604

(22) Filed: May 2, 2022

(65) Prior Publication Data

US 2022/0402083 A1 Dec. 22, 2022

(30) Foreign Application Priority Data

Jun. 18, 2021 (JP) .................................. 2021-101883

(51) Int. Cl.
*B23Q 11/00* (2006.01)
*A47L 7/00* (2006.01)
*A47L 9/24* (2006.01)
*B25D 17/20* (2006.01)

(52) U.S. Cl.
CPC ........ *B23Q 11/0046* (2013.01); *A47L 7/0095* (2013.01); *A47L 9/242* (2013.01); *A47L 9/248* (2013.01); *B23Q 11/0071* (2013.01); *B25D 17/20* (2013.01); *B25D 2217/0065* (2013.01)

(58) Field of Classification Search
None
See application file for complete search history.

(56) References Cited

U.S. PATENT DOCUMENTS

| | | | | |
|---|---|---|---|---|
| 2011/0008117 A1* | 1/2011 | Kasuya | ................ | B25D 17/088 408/67 |
| 2011/0008118 A1* | 1/2011 | Yoshikane | ......... | B23Q 11/0046 408/67 |
| 2012/0210535 A1* | 8/2012 | Miwa | ................. | B23Q 11/0046 15/246 |
| 2014/0020922 A1* | 1/2014 | Ikuta | .................. | B23Q 11/0825 173/198 |
| 2017/0355053 A1* | 12/2017 | Furusawa | .......... | B23Q 11/0046 |

(Continued)

FOREIGN PATENT DOCUMENTS

| | | | | | |
|---|---|---|---|---|---|
| JP | 2017013186 A | * | 1/2017 | ............. | B25D 17/18 |
| JP | 2019-217588 A | | 12/2019 | | |
| WO | WO-2016152921 A1 | * | 9/2016 | ............. | B23Q 11/00 |

*Primary Examiner* — Tanzim Imam
(74) *Attorney, Agent, or Firm* — Oliff PLC (57) ABSTRACT

A dust collection system for a power tool can collect, with an ordinary bit, dust with a flexible hose connected. A dust collection system for a power tool includes a power tool to receive a tip tool protruding frontward and including a tool body, a cylindrical first dust collection attachment attachable to the tool body and covering the tip tool over its entire circumference with the first dust collection attachment being attached, a second dust collection attachment attachable to the tool body and including a dust collector, and a flexible hose to connect the first dust collection attachment and the second dust collection attachment to collect dust sucked through the first dust collection attachment into the dust collector included in the second dust collection attachment.

18 Claims, 11 Drawing Sheets

(56) References Cited

U.S. PATENT DOCUMENTS

2019/0091819 A1* 3/2019 Mori .................. B23Q 11/0071
2019/0193224 A1* 6/2019 Furusawa ............... B25F 5/003
2019/0381618 A1* 12/2019 Furusawa ............ B23Q 11/127

* cited by examiner

DUST COLLECTION SYSTEM FOR POWER TOOL

CROSS-REFERENCE TO RELATED APPLICATIONS

This application claims the benefit of priority to Japanese Patent Application No. 20219-101883, filed on Jun. 18, 2021, the entire contents of which are hereby incorporated by reference.

BACKGROUND

1. Technical Field

The present disclosure relates to a dust collection system for a power tool.

2. Description of the Background

When a power tool such as a hammer drill is used to machine a workpiece such as a concrete or stone piece, a dust collection system with a dust collection attachment attached to the power tool is used to avoid dispersion of dust generated from the workpiece. For example, Japanese Unexamined Patent Application Publication No. 2019-217588 describes a dust collection system including a dust suction bit attached to a power tool, a hose attachment externally attached to the dust suction bit with a bit body having an internal dust suction passage, and a flexible hose connected to a dust collection device (dust collection attachment) connected to a suction head. A dust collection fan in the dust collection device rotates to generate a suction force at the tip of the bit body to suck dust together with outside air, which is then collected into a dust box in the dust collection device through the dust suction passage, the hose attachment, and the flexible hose.

BRIEF SUMMARY

The known dust collection system described above includes the dedicated dust suction bit. An ordinary bit without a dust suction passage or a hose attachment cannot be connected with a flexible hose to collect dust in the dust collection attachment.

One or more aspects of the present disclosure are directed to a dust collection system for a power tool that can collect, with an ordinary bit, dust with a dust collection attachment connected to a flexible hose.

A first aspect of the present disclosure provides a dust collection system for a power tool, the system including:
- a power tool to receive a tip tool protruding frontward, the power tool including a tool body;
- a first dust collection attachment being cylindrical, the first dust collection attachment being attachable to the tool body and covering the tip tool over an entire circumference of the tip tool with the first dust collection attachment being attached;
- a second dust collection attachment attachable to the tool body and including a dust collector; and
- a flexible hose to connect the first dust collection attachment and the second dust collection attachment, the flexible hose being configured to collect dust sucked through the first dust collection attachment into the dust collector included in the second dust collection attachment.

The dust collection system for a power tool according to the above aspect of the present disclosure can collect, with an ordinary bit other than a bit for collecting dust, dust with the dust collection attachment connected to the flexible hose.

DETAILED DESCRIPTION

First Embodiment

Embodiments of the present disclosure will now be described with reference to the drawings.

Figure 1:
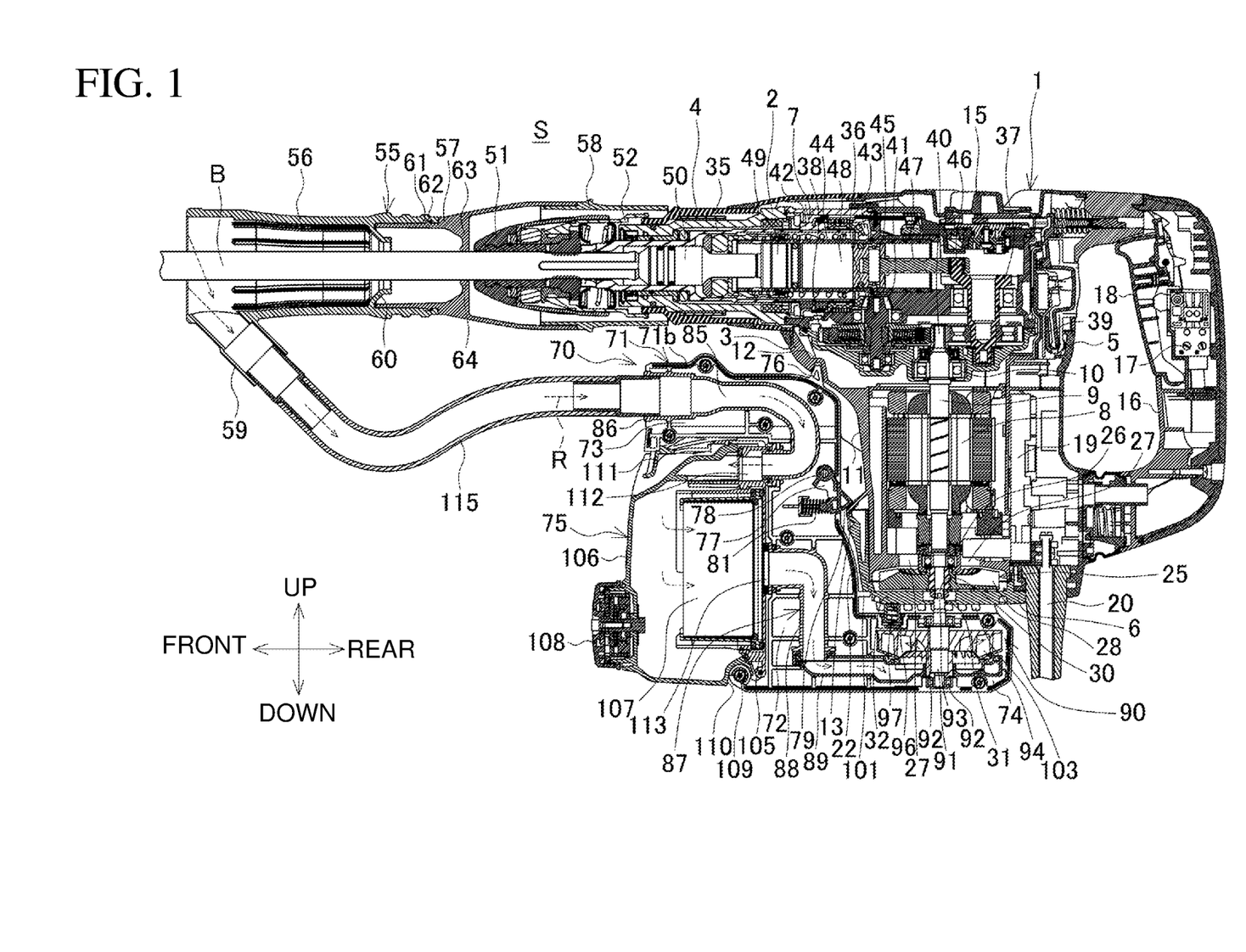
FIG. 1 is a longitudinal central sectional view of a dust collection system for a power tool according to a first embodiment.

FIG. 1 is a longitudinal central sectional view of a dust collection system S for a power tool (hereafter simply referred to as a dust collection system). The dust collection system S includes a hammer drill 1 as an example of a power tool, to which a first dust collection attachment (hereafter simply referred to as a first attachment) 55 and a second dust collection attachment (hereafter simply referred to as a second attachment) 70 are attached.

Hammer Drill

The hammer drill 1 includes, as a housing, an inner housing 2, a motor housing 3, an outer housing 4, a handle housing 5, and a lower housing 6.

The inner housing 2 accommodates a striking assembly 7. The motor housing 3 is connected to the outer housing 4 below the inner housing 2. The motor housing 3 accommodates a motor 8. The motor 8 is held in the motor housing 3 with a rotational shaft 9 facing upward. The rotational shaft 9 has an upper end supported by a bearing 10 held in the inner housing 2 and protruding into the inner housing 2.

Figure 2:
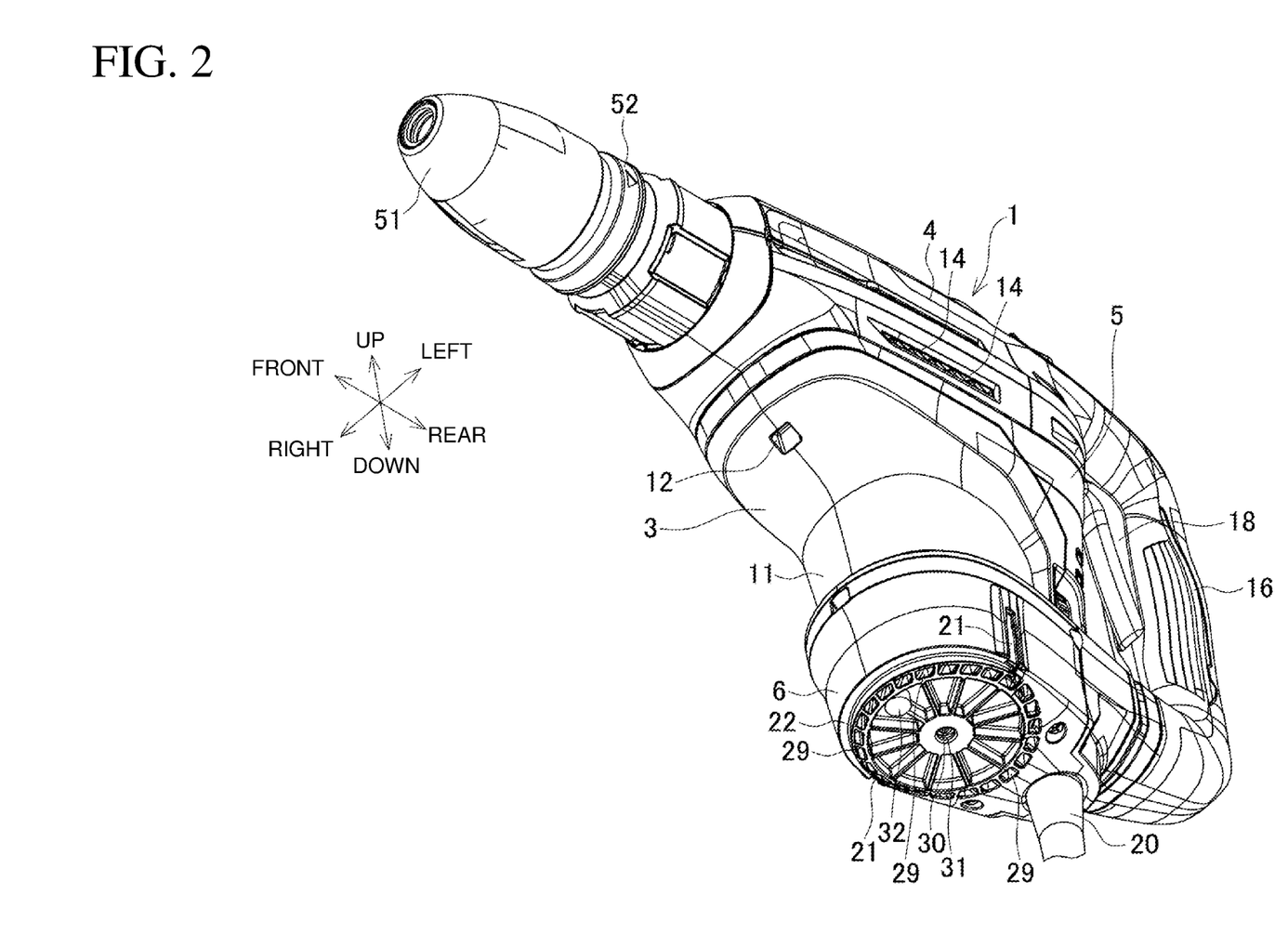
FIG. 2 is a perspective view of a hammer drill viewed from below.

As shown in FIG. 2, the motor housing 3 includes a neck 11 on its circumferential surface. The neck 11 has a smaller diameter than upper and lower portions of the motor housing 3. The motor housing 3 has an engagement recess 12 on the upper slope on its front surface above the neck 11. The engagement recess 12 is a blind hole that is open downward at the center in the lateral direction. The motor housing 3 has a receiving surface 13 on the lower slope on its front surface below the neck 11. The receiving surface 13 is a slightly recessed portion at the center in the lateral direction.

The outer housing 4 externally covers the inner housing 2 above the motor housing 3. The outer housing 4 has multiple body inlets 14 on its left and right side surfaces. The outer housing 4 includes a switching knob 15 on its upper surface.

The handle housing 5 extends from the rear of the outer housing 4 to the rear of the motor housing 3.

The handle housing 5 includes a handle 16. The handle 16 extends vertically behind the outer housing 4 and the motor housing 3. The handle 16 includes a switch 17. The switch 17 protrudes a switch lever 18 forward.

The motor housing 3 and the handle housing 5 accommodate a controller 19 including a control circuit board vertically between them. Below the controller 19, a power cord 20 is connected to the handle housing 5.

The lower housing 6 is fastened to the motor housing 3 with screws to cover the lower surface and the lower circumferential surface of the motor housing 3 from below. The lower housing 6 has a pair of engagement grooves 21 on its left and right side surfaces. Each engagement groove 21 extends upward from the lower surface of the lower housing 6. The lower housing 6 has, on its lower surface in front of the engagement grooves 21, a receiving groove 22 semicircular in a bottom view.

The lower surface of the motor housing 3 and the lower housing 6 define a body fan chamber 25 between them. The lower end of the rotational shaft 9 is supported by a bearing 26 located in the motor housing 3 and protrudes into the body fan chamber 25. The motor housing 3 has multiple vents 27 surrounding the bearing 26. The body fan chamber 25 accommodates a body fan 28 that is a centrifugal fan. The body fan 28 is orthogonally mounted at the lower end of the rotational shaft 9. The lower housing 6 has multiple body outlets 29 located concentrically on its lower surface. The body outlets 29 surround the outer circumference of the body fan 28.

The rotational shaft 9 has a coupling groove 30 on its lower end face in a diameter direction. The lower housing 6 has a through-hole 31 on its lower surface. The through-hole 31 is located directly below the rotational shaft 9 and exposes the coupling groove 30 downward. The lower housing 6 includes, on its lower surface in front of the through-hole 31, a receiving portion 32 circular in a bottom view.

The striking assembly 7 includes a tool holder 35. The tool holder 35 is held in a front portion of the inner housing 2. The tool holder 35 is cylindrical and extends in the front-rear direction. The inner housing 2 accommodates a countershaft 36 vertically supported in front of the rotational shaft 9. The inner housing 2 accommodates a crankshaft 37 vertically supported behind the rotational shaft 9. The countershaft 36 receives a gear 38. The crankshaft 37 receives a gear 39. The gears 38 and 39 mesh with a pinion 40 located at the upper end of the rotational shaft 9. The countershaft 36 receives a first bevel gear 41 on its upper end.

The tool holder 35 is spline-coupled with a switching sleeve 42. Behind the switching sleeve 42, a second bevel gear 43 is externally attached to the rear end of the tool holder 35 in a rotatable manner. The second bevel gear 43 meshes with the first bevel gear 41. With the switching sleeve 42 engaged at a backward position, the second bevel gear 43 transmits the rotation of the first bevel gear 41 to the tool holder 35. The switching knob 15 is operable to switch between a forward position and the backward position of the switching sleeve 42.

The inner housing 2 holds a cylinder 44 in its rear portion. The cylinder 44 is coaxially placed in a rear portion of the tool holder 35. The cylinder 44 accommodates a piston 45 movable back and forth. The crankshaft 37 includes an eccentric pin 46 protruding from its upper portion. The piston 45 and the eccentric pin 46 are connected by a connecting rod 47. The cylinder 44 accommodates, in front of the piston 45, a striker 49 movable back and forth through an air chamber 48. The tool holder 35 includes an impact bolt 50 in front of the striker 49. The impact bolt 50 comes in contact with a bit B placed in the front end of the tool holder 35. The tool holder 35 receives a tapered rubber stopper 51 at its front end. The tool holder 35 externally receives an operation sleeve 52 behind the rubber stopper 51. The operation sleeve 52 is operable to attach and detach the bit B.

When the switch lever 18 is pushed in to turn on the switch 17, the motor 8 drives and rotates the rotational shaft 9. The crankshaft 37 then rotates to move the piston 45 back and forth with the connecting rod 47. Thus, the interlocked striker 49 strikes the bit B with the impact bolt 50. The switching knob 15 is operable to switch the switching sleeve 42 to the backward position to activate a hammer drill mode. In the hammer drill mode, the rotation of the countershaft 36 is transmitted to the tool holder 35 with the second bevel gear 43. The switching sleeve 42 is switched to the forward position to activate a hammer mode. In the hammer mode, striking is simply performed without the tool holder 35 rotating.

First Attachment

The first attachment 55 is cylindrical and extends in the front-rear direction. The first attachment 55 is dividable into a front cylinder 56, a middle cylinder 57, and a rear cylinder 58. The front cylinder 56, the middle cylinder 57, and the rear cylinder 58 are formed from a synthetic resin (including rubber).

Figure 3:
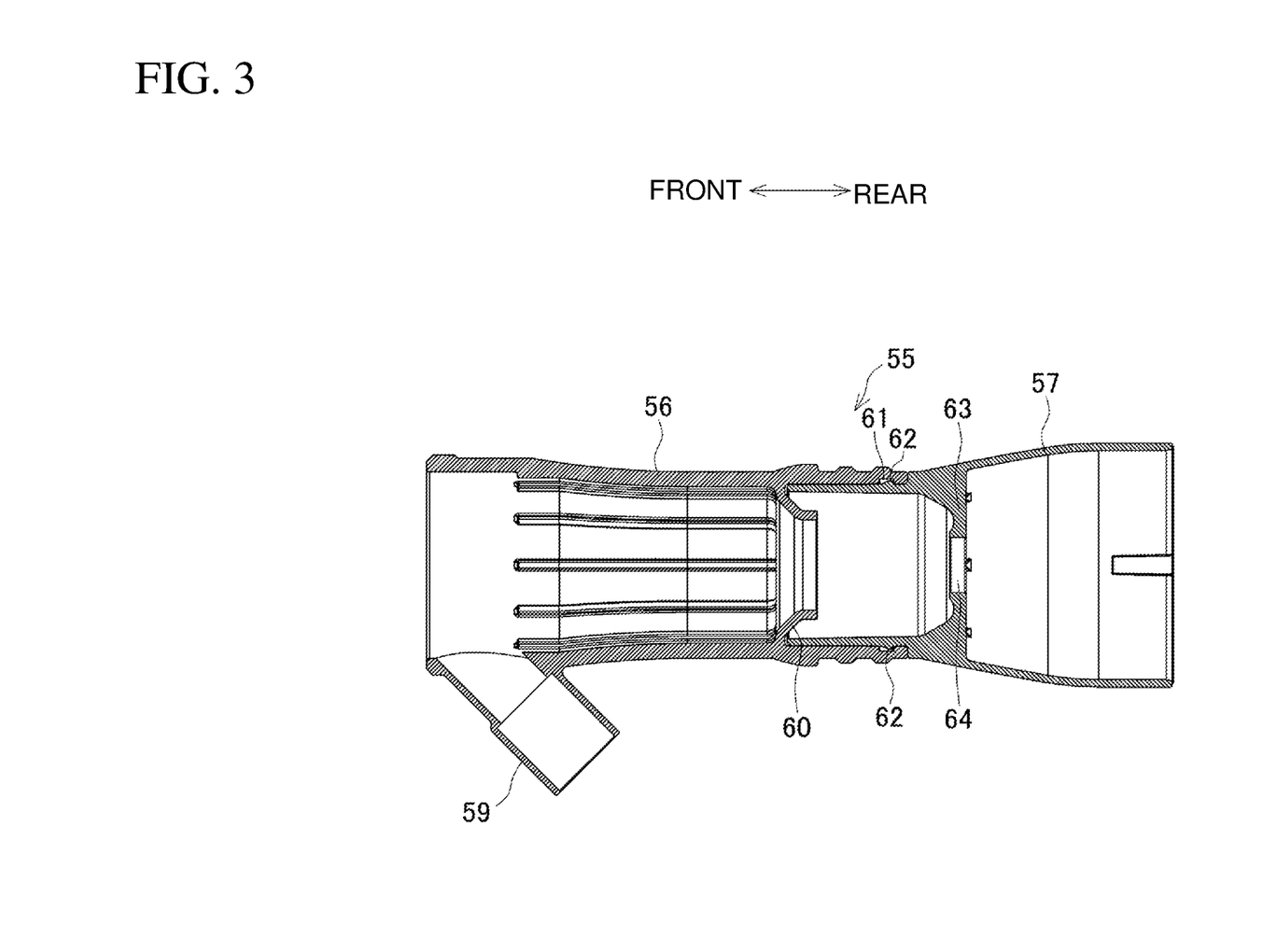
FIG. 3 is a longitudinal central sectional view of a first dust collection attachment in the first embodiment with a rear cylinder not shown.

As shown in FIG. 3, the front cylinder 56 integrally includes a connection cylinder 59 in its front outer circumferential portion. The connection cylinder 59 has a smaller diameter than the front cylinder 56. The connection cylinder 59 protrudes obliquely rearward, away from the axis of the front cylinder 56 as the connection cylinder 59 extends rearward from the circumferential surface of the front cylinder 56. The front cylinder 56 includes a tapered cylinder 60 coaxially located on its rear inner surface. The tapered cylinder 60 has a gradually smaller diameter toward the rear. The front cylinder 56 has an annular groove 61 on the inner surface of its rear end.

A front portion of the middle cylinder 57 is placed in a rear portion of the front cylinder 56 from the rear to be detachably attached. The middle cylinder 57 includes multiple protrusions 62 on its front outer circumference. The protrusions 62 are arranged at equal intervals in the circumferential direction of the middle cylinder 57. The protrusions 62 engage with the groove 61 at the position of its insertion into the front cylinder 56. The middle cylinder 57 includes a partition 63 on the inner surface of its middle portion. The partition 63 is adjacent to the front end of the rubber stopper 51 when attached to the hammer drill 1. The partition 63 has a through-hole 64 at its center. The middle cylinder 57 has a larger diameter toward the rear from the partition 63. A rear portion of the middle cylinder 57 has a larger diameter than the operation sleeve 52 and a front portion of the outer housing 4.

The rear cylinder 58 also has a larger diameter than the operation sleeve 52 and the front portion of the outer housing 4. A front portion of the rear cylinder 58 is placed in the rear portion of the middle cylinder 57 from the rear to be detachably attached. The rear cylinder 58 is fitted to the front portion of the outer housing 4 from the front to be coaxially attachable to the tool holder 35.

Second Attachment

Figure 4:
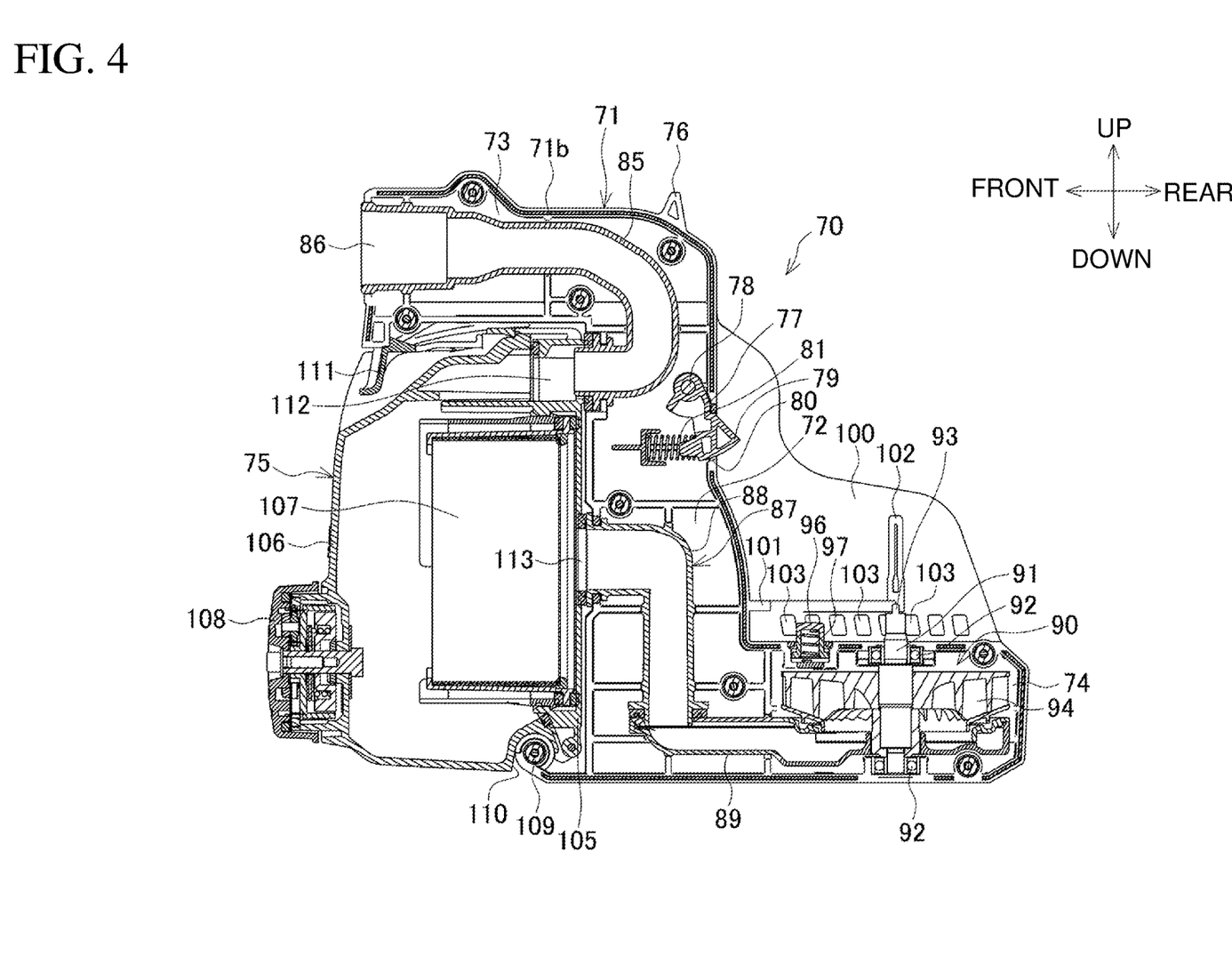
FIG. 4 is a central longitudinal sectional view of a second dust collection attachment.
Figure 5:
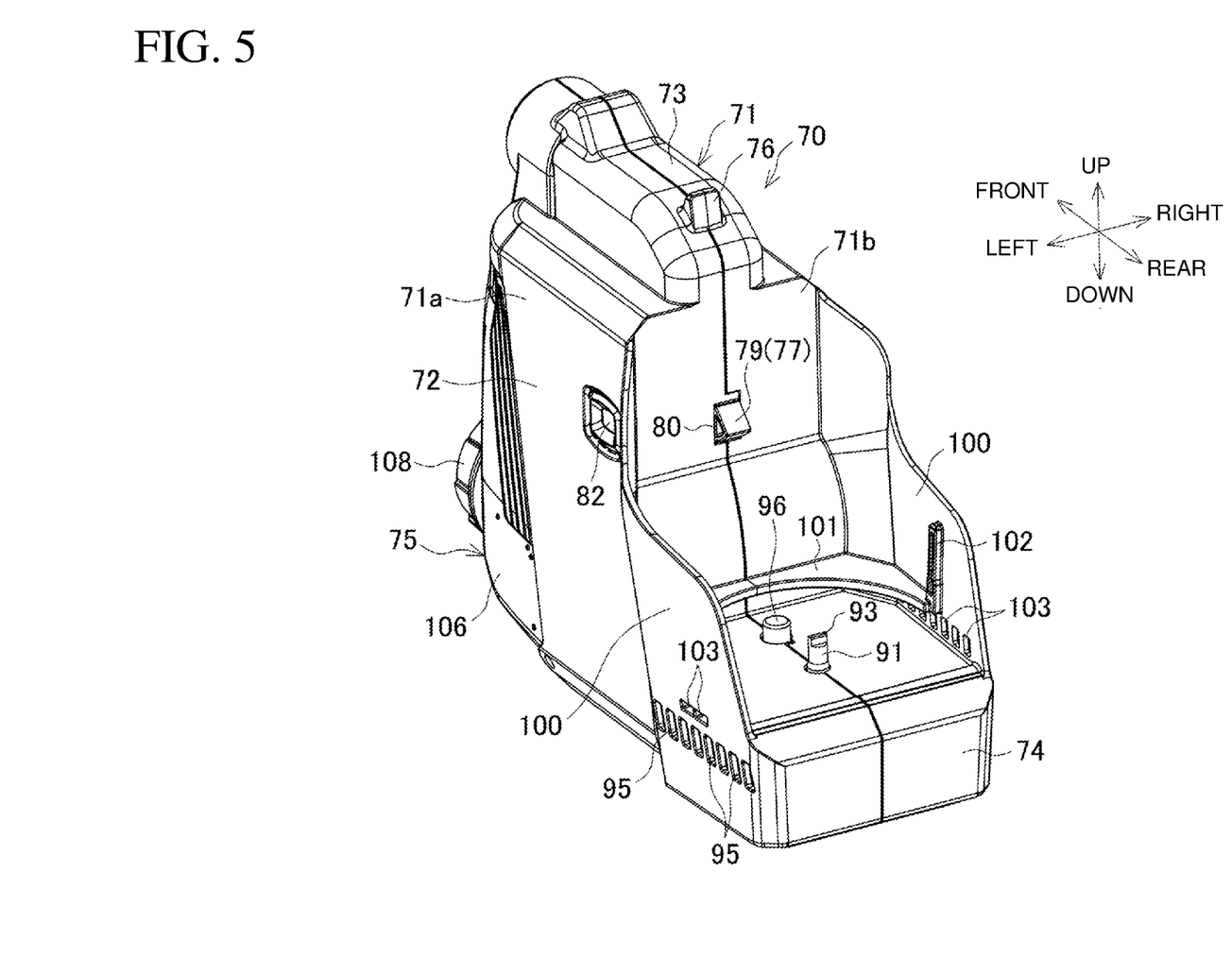
FIG. 5 is a rear perspective view of the second dust collection attachment.

As shown in FIGS. 4 and 5, the second attachment 70 includes a box-like casing 71. The casing 71 includes left and right half casings 71a and 71b fastened with screws. The casing 71 includes a body 72, a front protrusion 73, and a rear protrusion 74. The body 72 extends vertically. The front protrusion 73 extends frontward from an upper portion of the body 72. A dust box 75 is connected in front of the body 72 and below the front protrusion 73. The rear protrusion 74 extends rearward from a lower portion of the body 72. The body 72 and the rear protrusion 74 are attachable to the hammer drill 1.

The body 72 includes an engagement protrusion 76 protruding upward from its upper surface and at the center in the lateral direction. The engagement protrusion 76 is insertable into the engagement recess 12 on the motor housing 3. The body 72 receives a stopper 77 on its rear surface and at the center in the lateral direction. The upper end of the stopper 77 is supported by a shaft 78 in the body 72 to be swingable back and forth. The shaft 78 extends in the lateral direction. The stopper 77 includes, in its lower rear portion, a locking portion 79 that is triangular in a side view. The body 72 has a window 80 in its rear surface corresponding to the locking portion 79. The stopper 77 is swingable back and forth between its protruding and retracted positions. At the protruding position, the locking portion 79 protrudes from the window 80. At the retracted position, the locking portion 79 retracts inside the window 80.

The body 72 accommodates a coil spring 81. The coil spring 81 urges the stopper 77 to the protruding position. The body 72 includes a release button 82 on its left surface. When the release button 82 is pushed in toward the body 72, a coupling member (not shown) swings the stopper 77 to the retracted position against the urging force from the coil spring 81.

The front protrusion 73 accommodates an upper duct 85. The upper duct 85 includes a larger-diameter connector 86 at its front end. The connector 86 opens frontward on the front surface of the front protrusion 73. The upper duct 85 extends rearward in the front protrusion 73 and turns around in the body 72. The rear end of the upper duct 85 is open to the front surface of the body 72 below the front protrusion 73.

The body 72 accommodates a lower duct 87. The lower duct 87 is dividable into a front duct portion 88 and a rear duct portion 89. The front duct portion 88 is L-shaped in a side view. The front upper end of the front duct portion 88 is open to the front surface of the body 72 below the upper duct 85. The front end of the rear duct portion 89 is attached to the lower end of the front duct portion 88. The rear duct portion 89 extends rearward. The rear duct portion 89 includes a disk portion at its rear end, which has an opening in its upper surface inside the rear protrusion 74.

The rear protrusion 74 defines a fan chamber 90 above the rear duct portion 89. The fan chamber 90 accommodates a fan shaft 91. The fan shaft 91 is axially supported in the vertical direction with bearings 92 located above and below inside the rear protrusion 74. The fan shaft 91 extends through the center of the opening of the rear duct portion 89.

The upper end of the fan shaft 91 extends upward through the rear protrusion 74. The fan shaft 91 includes a coupling protrusion 93 extending in the radial direction on its upper end face. The coupling protrusion 93 can be coupled to the coupling groove 30 on the lower end of the rotational shaft 9.

The fan chamber 90 accommodates a dust collection fan 94 that is a centrifugal fan. The dust collection fan 94 is attached orthogonally to the fan shaft 91. The rear protrusion 74 has multiple lower outlets 95 on its left and right side surfaces, which are located radially outside the dust collection fan 94. The multiple lower outlets 95 are aligned in the front-rear direction.

The rear protrusion 74 has, on its upper surface, a pressure cap 96 in front of the fan shaft 91. The pressure cap 96 is circular in a plan view. The pressure cap 96 is urged to its protruding position from the upper surface of the rear protrusion 74 by a coil spring 97 located inside the pressure cap 96. The pressure cap 96 corresponds to the receiving portion 32 of the lower housing 6.

The body 72 includes, in its left and right rear portions, side plates 100 extending to the upper portions of the rear protrusion 74. The motor housing 3 and the lower housing 6 can be fitted between the side plates 100.

A rib 101 is located in the lateral direction between the rear face of the body 72 and the inner surface of each side plate 100. The rear edge of the rib 101 is semicircular in a plan view. The rib 101 is contactable with the receiving groove 22 on the lower surface of the lower housing 6 from below.

Each side plate 100 includes an engagement ridge 102 on its inner surface, which is continuous with the left or right rear end of the rib 101. Each engagement ridge 102 extends vertically. The engagement ridges 102 are engageable with the engagement grooves 21 on the side surfaces of the lower housing 6 from below. Each side plate 100 has multiple upper outlets 103 below the rib 101. The upper outlets 103 are aligned in the front-rear direction.

The dust box 75 is a box attached to the casing 71 from the front. The dust box 75 includes a lid 105 and a box body 106 that are hinged together at the lower ends of the lid 105 and the box body 106. The lid 105 holds a filter 107 on its front inner surface. The box body 106 covers the filter 107 from the front. The box body 106 receives a vibrator 108 on its front surface. The vibrator 108 applies vibration to the box body 106 with a rotating operation. The vibration transmits to the filter 107 through the lid 105 to shake off dust adhering to the filter 107.

The body 72 receives a locking shaft 109 on the lower end of its front surface. The locking shaft 109 extends in the lateral direction. The box body 106 has a receiving recess 110 on its lower surface. The receiving recess 110 extends in the lateral direction. The locking shaft 109 is engaged with the receiving recess 110. A locking tab 111 at the upper end of the lid 105 is elastically engaged with the lower surface of the front protrusion 73. This allows the dust box 75 to be detachably attached to the casing 71.

The lid 105 has an inlet 112 in its upper portion and an outlet 113 in its lower portion. The outlet 113 is located behind the filter 107. With the dust box 75 attached, the inlet 112 is connected to the rear end of the upper duct 85 and the outlet 113 is connected to the upper end of the front duct portion 88 of the lower duct 87.

Dust Collection System

In the hammer drill 1 receiving the bit B, the rear cylinder 58 is externally attached to the outer housing 4 from the front and thus the first attachment 55 is attached. The bit B extends through the through-hole 64 in the partition 63 and further through the tapered cylinder 60 in the front cylinder 56. Thus, the first attachment 55 is attached, with the tip of the bit B protruding frontward from the front cylinder 56.

With the rear protrusion 74 below the lower housing 6, and with the engagement ridges 102 on the side plates 100 vertically aligned with the engagement grooves 21 on the lower housing 6, the second attachment 70 is moved upward relative to the hammer drill 1. Thus, the engagement ridges 102 fit into the engagement grooves 21 from below, and the engagement protrusion 76 on the body 72 is received in the engagement recess 12 on the motor housing 3 from below. The rib 101 comes in contact with the receiving groove 22 on the lower housing 6 from below.

The stopper 77 then interferes with the lower housing 6 that relatively moves downward, and swings from the protruding position to the retracted position. This allows relative movement of the second attachment 70. At the attachment position of the second attachment 70, the locking portion 79 of the stopper 77 that is returned to the protruding position engages with the receiving surface 13 of the motor housing 3 from above. This regulates the downward movement of the second attachment 70 relative to the hammer drill 1. This completes the attachment of the second attachment 70.

For this attachment, the upper end of the fan shaft 91 extends through the through-hole 31 in the lower housing 6, and the coupling protrusion 93 fits into the coupling groove 30 on the rotational shaft 9 once the attachment is complete. Thus, the fan shaft 91 is integrally connected to the rotational shaft 9 in the rotation direction. When the coupling groove 30 and the coupling protrusion 93 are out of phase, the fan shaft 91 may be rotated to align their phases.

In the above attachment, the pressure cap 96 is in contact with the receiving portion 32 on the lower surface of the lower housing 6 and is lowered into the rear protrusion 74 against the urging force from the coil spring 97. Once the attachment is complete, the pressure cap 96 presses the receiving portion 32 from below under the urging force from the coil spring 97. This structure reduces the likelihood that the second attachment 70 being attached rattles.

A flexible hose 115 is connected between the connection cylinder 59 in the first attachment 55 and the connector 86 in the second attachment 70. The flexible hose 115 is a bellows-like hose that is urged to axially contract.

The flexible hose 115 is connected to define a dust collection path R to allow air to flow through the first attachment 55 and the second attachment 70. As indicated by the dotted arrows in FIG. 1, the dust collection path R extends from the front end of the front cylinder 56 to the lower outlets 95 through the connection cylinder 59, the flexible hose 115, the upper duct 85, the dust box 75, the lower duct 87, and the fan chamber 90.

In the dust collection system S in use, the tip of the bit B is pressed against the target surface of a workpiece, and the switch lever 18 is operationally pushed in to turn on the switch 17. The motor 8 then drives and rotates the rotational shaft 9 to rotate the countershaft 36 and the crankshaft 37. The piston 45 then constantly reciprocates independently of whether the hammer drill mode or the hammer mode is selected. Thus, the interlocked striker 49 strikes the bit B with the impact bolt 50.

As the rotational shaft 9 rotates, the fan shaft 91 and the dust collection fan 94 also rotate integrally. The dust collection path R then is under a negative pressure to generate a suction force in the opening of the front cylinder 56 in the first attachment 55. Thus, dust generated from the workpiece is sucked into the front cylinder 56 and enters the upper duct 85 through the connection cylinder 59 and the flexible hose 115. The dust then enters the dust box 75, is captured on the filter 107, and is stored in the box body 106. The dust sucked into the front cylinder 56 is immediately sucked into the connection cylinder 59 and collected into the second attachment 70 from the flexible hose 115. Thus, the dust is less likely to remain in the first attachment 55.

In the hammer drill 1, the body fan 28 rotates together with the rotational shaft 9. This causes outside air to be sucked in through the body inlets 14. The sucked air flows between the outer housing 4 and the inner housing 2 to cool the inner housing 2. The air then flows through the motor 8 to cool the motor 8, further through the vent 27 to the body fan chamber 25 and is discharged downward through the body outlets 29. The side plates 100 in the second attachment 70 are located on the left and right of the lower housing 6. Each side plate 100 has the upper outlets 103. The discharged air thus partly flows below the lower housing 6 and is discharged through the upper outlets 103 in the left and right side plates 100. Any other portion of the discharged air is discharged to the rear, at which no side plate 100 is located.

The first attachment 55 is detachable from the hammer drill 1 by pulling out the rear cylinder 58 forward from the outer housing 4. The flexible hose 115 is also detachable by pulling out its front end from the connection cylinder 59 and its rear end from the connector 86.

To detach the second attachment 70 from the hammer drill 1, the release button 82 in the body 72 is pushed in to move the stopper 77 to the retracted position. The locking portion 79 is then removed from the receiving surface 13, allowing relative movement of the second attachment 70. The second attachment 70 is relatively moved away from the hammer drill 1 in the direction opposite to the attachment. The engagement ridges 102 on the side plates 100 then disengage from the engagement grooves 21 on the lower housing 6, and the rib 101 moves away from the receiving groove 22. Simultaneously, the engagement protrusion 76 on the body 72 is removed from the engagement recess 12 on the motor housing 3. This completes the detachment of the second attachment 70.

To discard dust stored in the dust box 75, the locking tab 111 is pushed down to release its lock with the front protrusion 73. The dust box 75 is immediately tilted frontward about the locking shaft 109. The dust box 75 can then be detached from the casing 71. After the lid 105 is open, the dust stored inside the box body 106 can be discarded.

The dust collection system S according to the first embodiment includes the hammer drill 1 (power tool) that can receive the bit B (tip tool) protruding frontward and includes the outer housing 4 (tool body), and a dust collection attachment attachable to the hammer drill 1. The dust collection attachment includes the first attachment 55 that is cylindrical, attachable to the outer housing 4, and covers the bit B over its entire circumference with the first attachment 55 being attached, the second attachment 70 that is attachable to the motor housing 3 and the lower housing 6 (tool body) and includes the dust box 75 (dust collection part), and the flexible hose 115 that connects the first attachment 55 and the second attachment 70. Dust sucked through the first attachment 55 into the dust box 75 included in the second attachment 70 can be collected through the flexible hose 115.

With an ordinary bit that is not for collecting dust, dust is collectable into the second attachment 70 through the flexible hose 115 connected to the first attachment 55. This improves usability.

The first attachment 55 includes the connection cylinder 59 (connector) for connecting to the flexible hose 115 in its front portion. Dust sucked through the first attachment 55 can be quickly collected into the second attachment 70 through the flexible hose 115. Thus, dust is less likely to accumulate in the first attachment 55.

The flexible hose 115 is urged to axially contract. Thus, the flexible hose 115 is less likely to interfere with work.

The second attachment 70 includes the dust collection fan 94 that receives power from the hammer drill 1. The second attachment 70 can exclude a motor and can be less heavy.

The dust collection fan 94 includes the fan shaft 91. The hammer drill 1 includes the motor 8 including the rotational shaft 9 inside the motor housing 3. With the second attachment 70 being attached to the motor housing 3 and the lower housing 6, the fan shaft 91 is connected to the lower end of the rotational shaft 9 drivable and rotatable with the motor 8 to supply power to the dust collection fan 94. The rotational shaft 9 can thus be easily used to drive the dust collection fan 94.

Other Embodiments

Other embodiments of the present disclosure will now be described. The same reference signs denote the same components in the first embodiment. Such components will not be described repeatedly.

Second Embodiment

Figure 6:
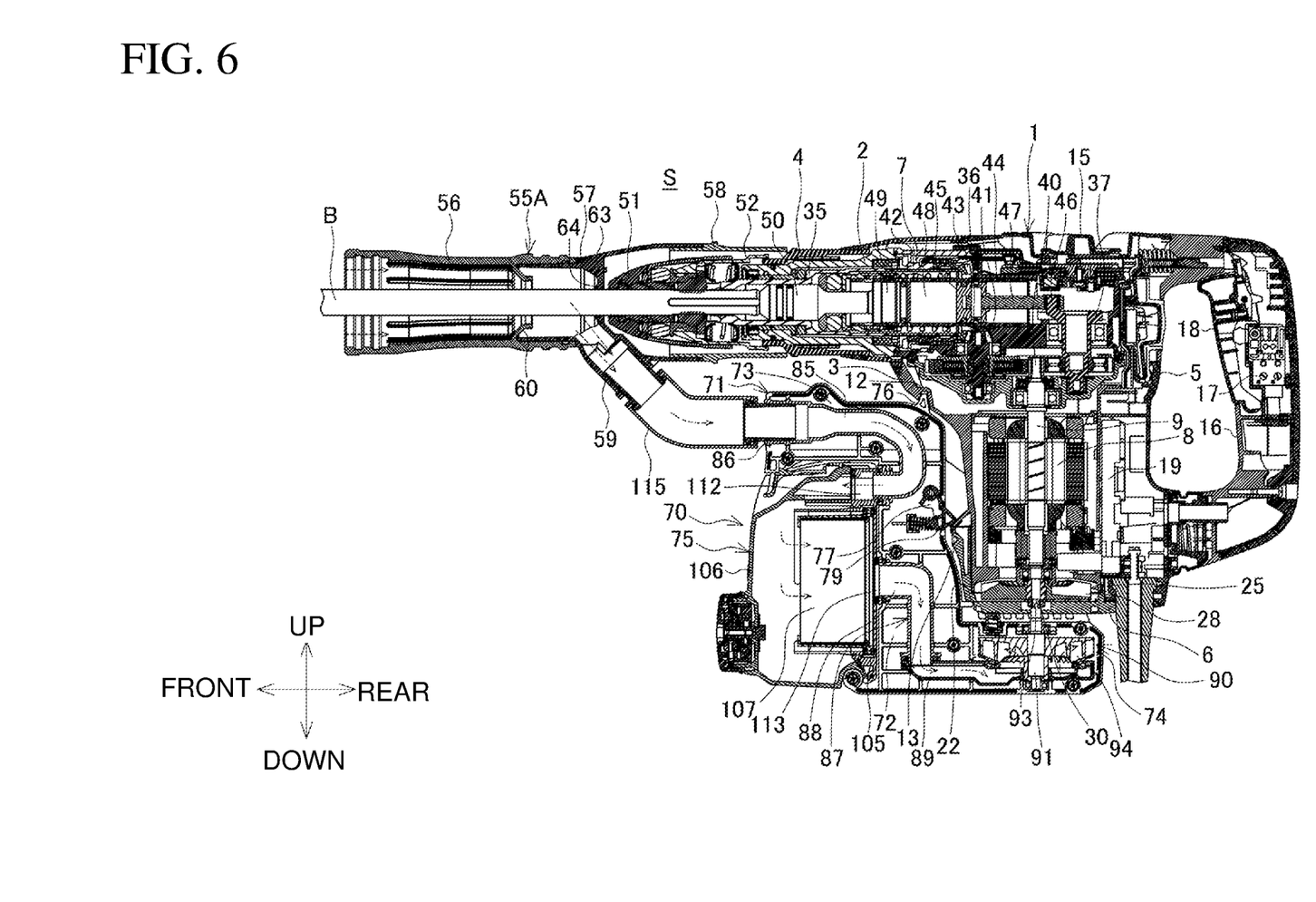
FIG. 6 is a longitudinal central sectional view of a dust collection system for a power tool according to a second embodiment.

The dust collection system S shown in FIG. 6 differs from that in the first embodiment in the form of the first attachment.

Figure 7:
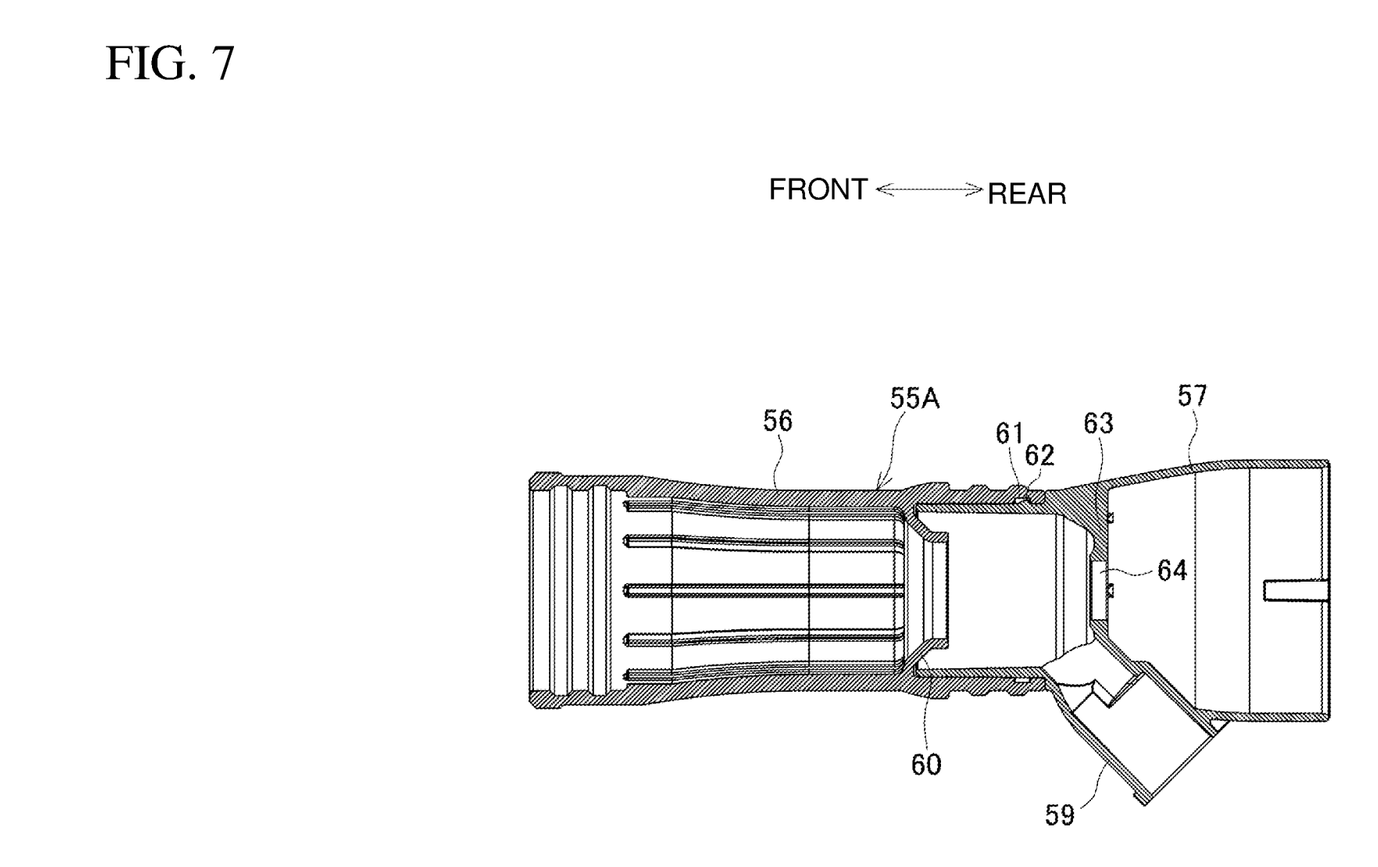
FIG. 7 is a longitudinal central sectional view of a first dust collection attachment in the second embodiment with a rear cylinder not shown.

A first attachment 55A in the present embodiment does not include the connection cylinder 59 in its front cylinder 56. As shown in FIG. 7, the connection cylinder 59 protrudes rearward from the outer circumference of a middle portion of the middle cylinder 57. Thus, the connection cylinder 59 is located at the rear of the first attachment 55A. The other components are the same as in the first embodiment.

The dust collection system S according to the second embodiment also allows dust sucked through the first attachment 55A to be collectable into the dust box 75 in the second attachment 70 through the flexible hose 115. Thus, when an ordinary bit that is not for collecting dust is used, dust is collectable into the second attachment 70 through the flexible hose 115 connected to the first attachment 55A. This improves usability.

In particular, the first attachment 55A includes the connection cylinder 59 for connecting to the flexible hose 115 in its rear portion. This structure reduces the distance between the connection cylinder 59 and the connector 86 in the second attachment 70 compared with in the first embodiment. Thus, the flexible hose 115 is shorter, easier to connect to, and less likely to interfere with work.

Modifications of the first and second embodiments will now be described.

The connection cylinder in the first attachment is not limited to being located downward from the lower surface of the first attachment as in the first and second embodiments described above. The connection cylinder may be located on the side surface or on the upper surface of the first attachment instead of the lower surface.

The first attachment is not limited to the structure dividable into three cylinders. The first attachment may be a single cylinder or may be dividable into two or four or more cylinders. However, when the three divided cylinders are used as in the first and second embodiments above, the rear cylinder is sharable, and the position of the connection cylinder can be changed by replacing the attachment of the front and middle cylinders.

The first attachment may be axially split (longitudinally split).

The connection cylinder may include a plug that can close the connection cylinder. With the plug closing the connection cylinder, the first attachment is usable as a separate dust collection cup.

Third Embodiment

Figure 8:
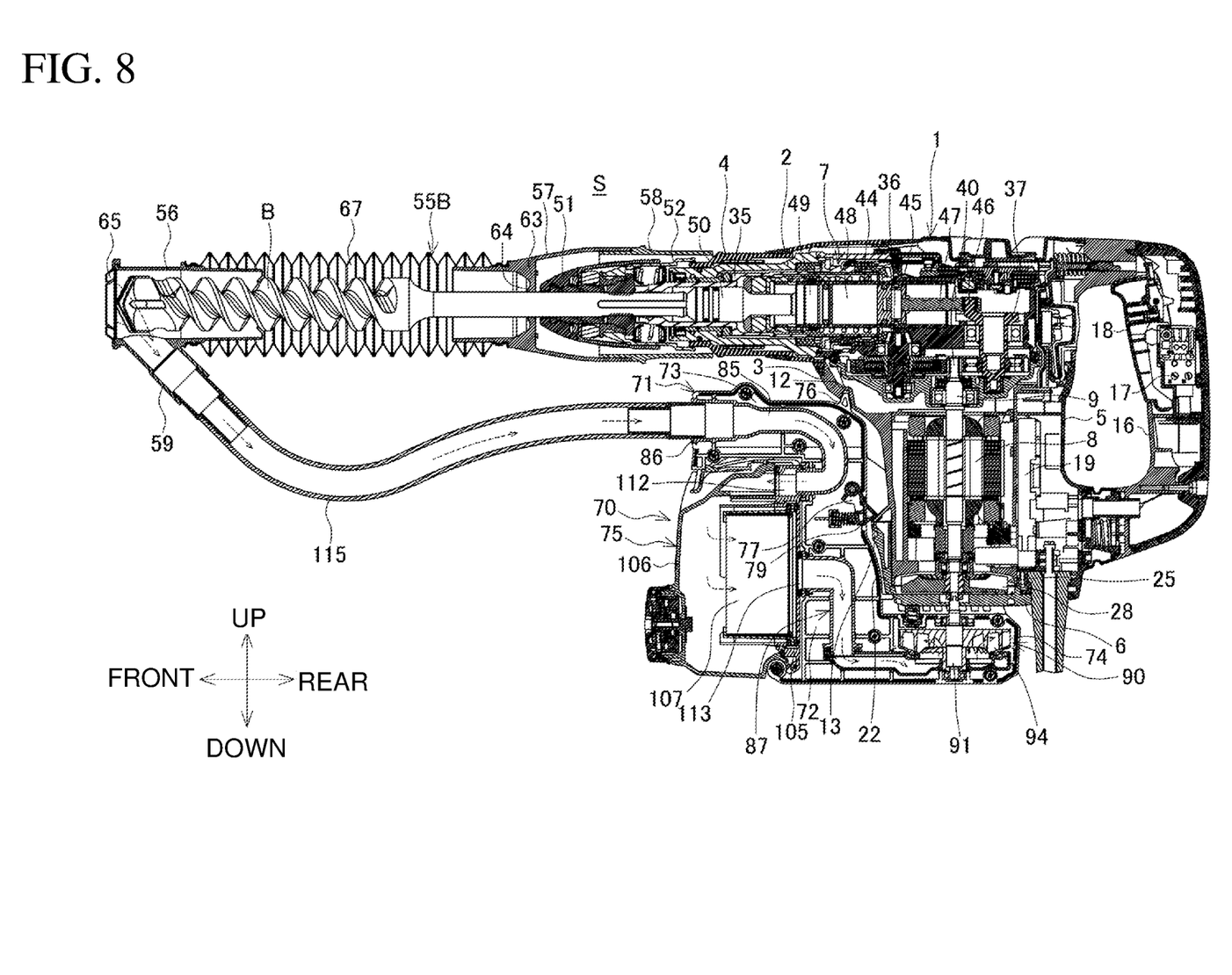
FIG. 8 is a longitudinal central sectional view of a dust collection system for a power tool according to a third embodiment.
Figure 9:
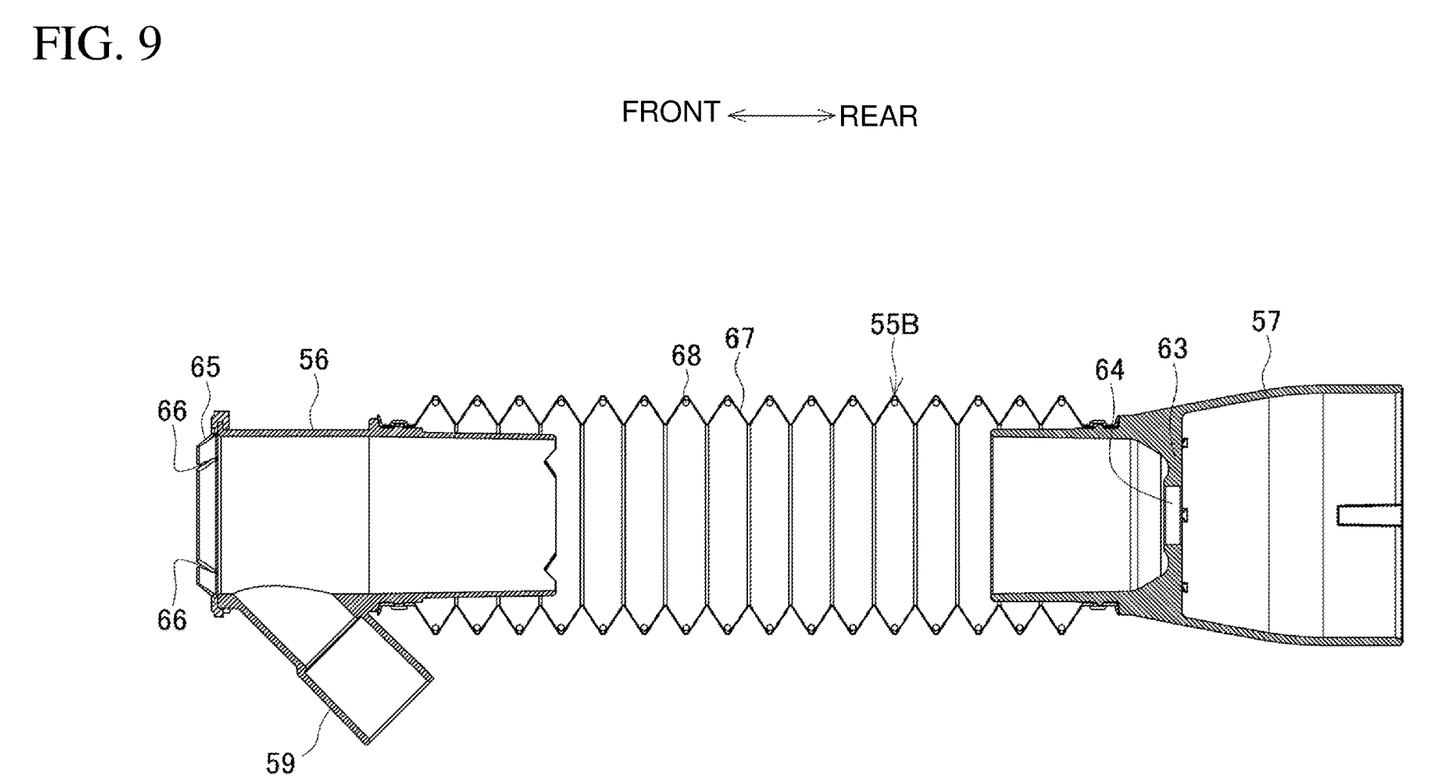
FIG. 9 is a longitudinal central sectional view of a first dust collection attachment in the third embodiment with a rear cylinder not shown.

The dust collection system S shown in FIG. 8 also differs from that in the first and second embodiments in the form of the first attachment. The connection cylinder 59 is located in the front cylinder 56 in a first attachment 55B, and the front cylinder 56 has a shorter axial length than in the first and second embodiments. As shown in FIG. 9, a rubber seal 65 is attached to the front end of the front cylinder 56. The rubber seal 65 is fitted to the front end of the front cylinder 56 at its rear end and is a short, cylindrical seal that tapers frontward. The rubber seal 65 includes multiple radial notches 66 on its inner circumference at circumferentially equal intervals.

A flexible hose 67 is coaxially between the front cylinder 56 and the middle cylinder 57 to serve as a fourth cylinder. The front end of the flexible hose 67 is externally attached to the rear portion of the front cylinder 56. The rear end of the flexible hose 67 is externally attached to the front portion of the middle cylinder 57. The front cylinder 56 is stiffer than the flexible hose 67.

The flexible hose 67 is bellows-like, axially extendable, and retractable. The flexible hose 67 holds a spiral wire 68 on its inner circumference. The flexible hose 67 is thus urged in the extending direction under the repulsive force from the wire 68. The entire length of the drill bit (the bit B in the present embodiment) is covered by the extending first attachment 55B.

When the dust collection system S including the first attachment 55B is used to machine a workpiece, the front cylinder 56 in the first attachment 55B is pressed against the target surface of the workpiece. The rubber seal 65 at the front end of the front cylinder 56 is then pressed against the target surface and elastically deforms to seal between the target surface and the front cylinder 56. This structure reduces the likelihood that suction power decreases, allowing dust to be sucked in efficiently.

Once the bit B partially enters the workpiece drilling a hole, the flexible hose 67 axially contracts against the urging force from the wire 68. Thus, the rubber seal 65 is constantly in contact with the target surface.

The dust collection system S according to the third embodiment also allows dust sucked through the first attachment 55B to be collectable into the dust box 75 in the second attachment 70 through the flexible hose 115. With an ordinary bit that is not for collecting dust, dust is collectable into the second attachment 70 through the flexible hose 115 connected to the first attachment 55B. This improves usability.

In particular, the first attachment 55B is axially extendable and retractable by the flexible hose 67. This structure allows the axial length of the first attachment 55B to change as the machining of a workpiece proceeds. This improves usability.

The first attachment 55B includes a bellows-like portion including the spiral wire 68. This structure allows the first attachment 55B to be urged in the extending direction to maintain the front end of the first attachment 55B in contact with the target surface appropriately.

The front cylinder 56 in the first attachment 55B is stiffer than the flexible hose 67. This allows the front cylinder 56 to come in contact with the target surface in an appropriate posture without tilting the front cylinder 56.

The rubber seal 65 (seal) is located at the front end of the first attachment 55B to seal between the first attachment 55B and a workpiece with the rubber seal 65 in contact with the workpiece. This structure reduces the likelihood that dust leakage and loss of suction power occur on the contact surface between the first attachment 55B and the workpiece, thus allowing efficient collection of dust.

Fourth Embodiment

Figure 10:
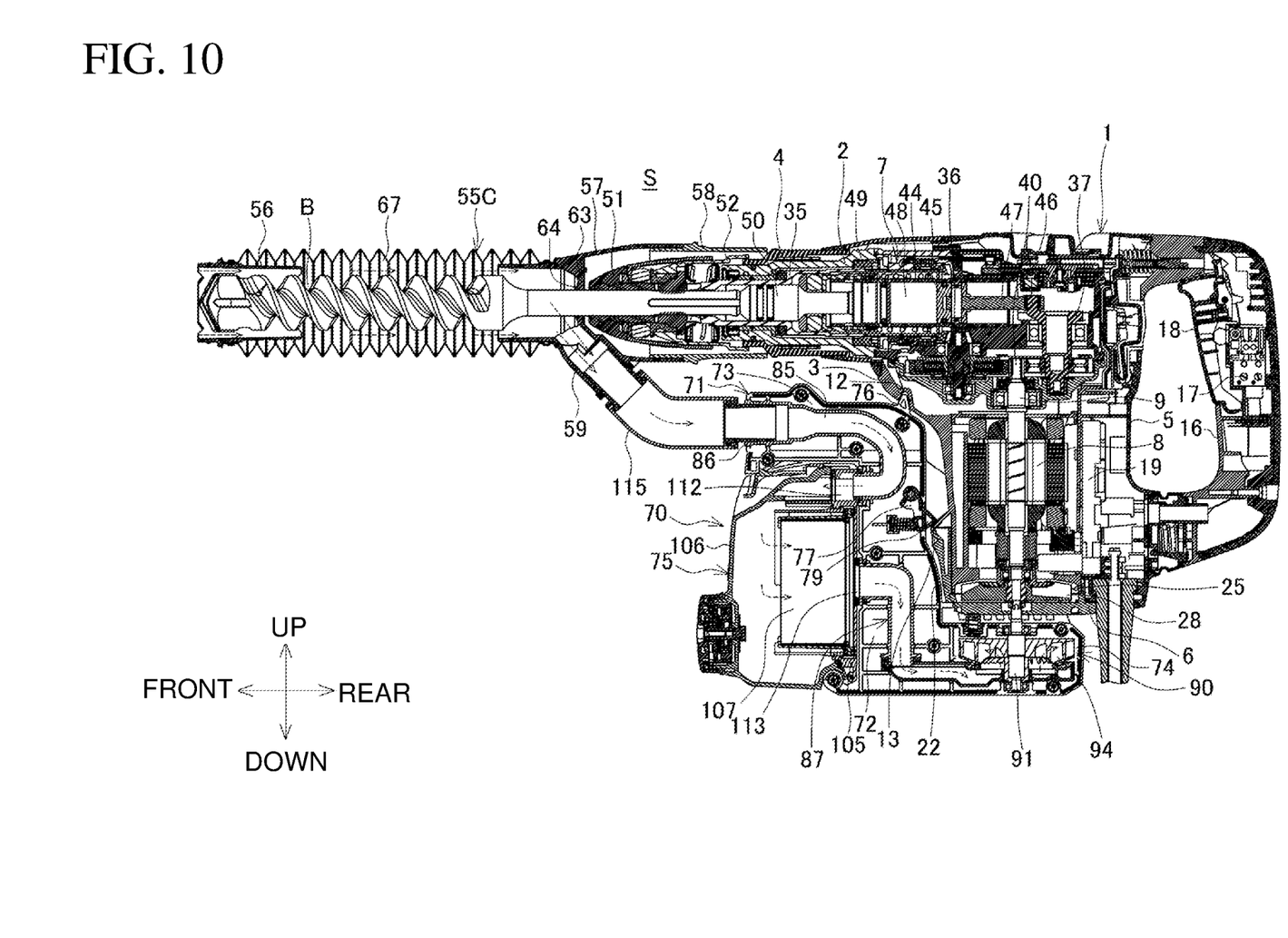
FIG. 10 is a longitudinal central sectional view of a dust collection system for a power tool according to a fourth embodiment.

The dust collection system S shown in FIG. 10 differs from that in the third embodiment in the form of the first attachment.

Figure 11:
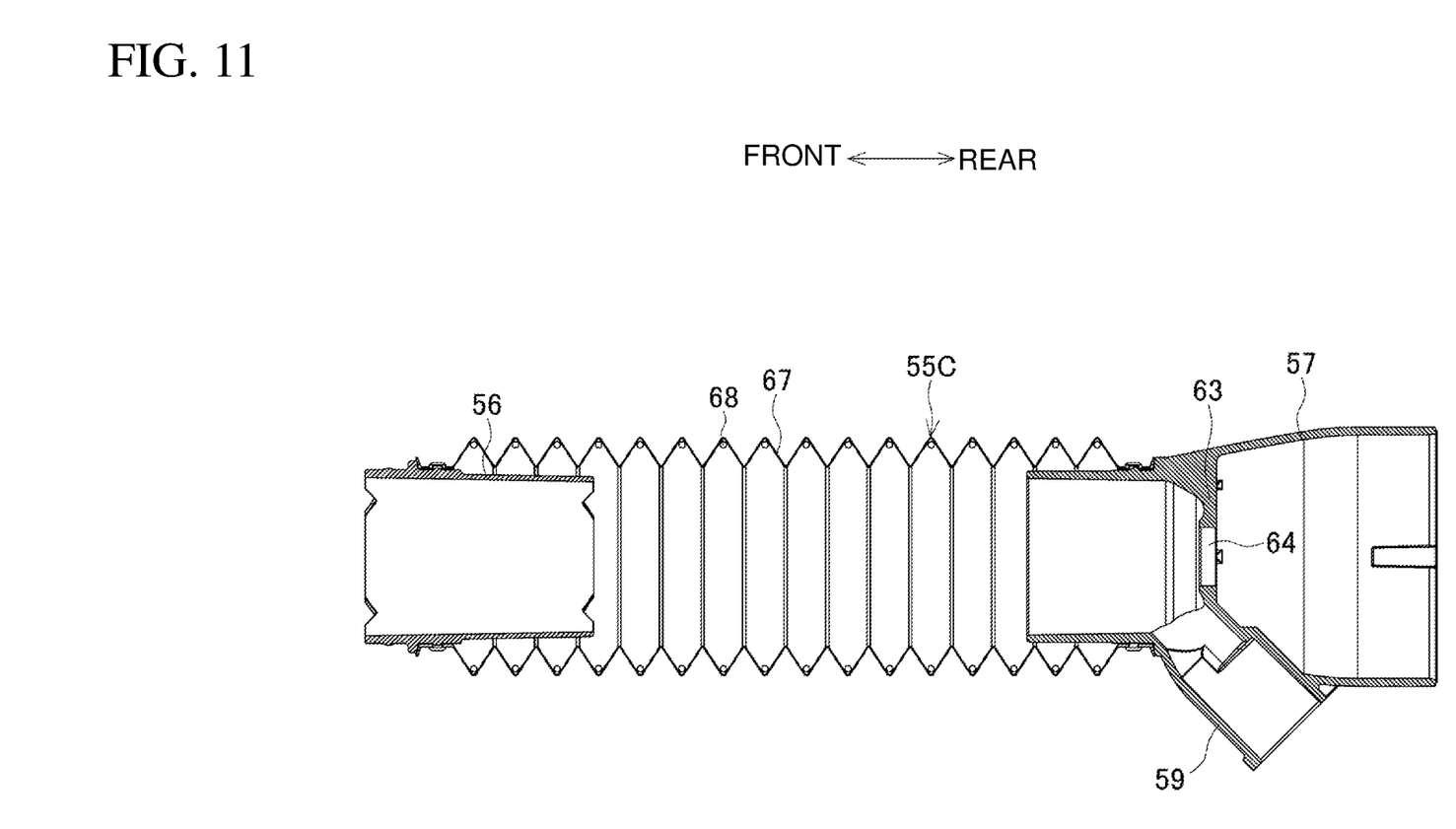
FIG. 11 is a longitudinal central sectional view of a first dust collection attachment in the fourth embodiment with a rear cylinder not shown.

In a first attachment 55C in the present embodiment, the front cylinder 56 does not include the connection cylinder 59 and the rubber seal 65. As also shown in FIG. 11, the connection cylinder 59 protrudes rearward from the outer circumference of the middle portion of the middle cylinder 57. Thus, the connection cylinder 59 is located in a rear portion of the first attachment 55C. The other components are the same as in the third embodiment.

The dust collection system S according to the fourth embodiment also allows dust sucked through the first attachment 55C to be collectable into the dust box 75 in the second attachment 70 through the flexible hose 115. Thus, when an ordinary bit that is not for collecting dust is used, dust is collectable in the second attachment 70 by connecting the flexible hose 115 to the first attachment 55C. This improves usability.

In particular, the connection cylinder 59 is located in the rear portion of the first attachment 55C. The distance to the connector 86 in the second attachment 70 is shorter than in the third embodiment. Thus, the flexible hose 115 is shorter, easier to connect to, and less likely to interfere with work.

Modifications of the third and fourth embodiments will now be described.

The connection cylinder in the first attachment is not limited to being located downward from the lower surface of the first attachment as in the third and fourth embodiments. The connection cylinder may be located on the side surface or on the upper surface of the first attachment instead of the lower surface.

The flexible hose may be bellows-like and without a wire.

The first attachment is not limited to the structure dividable into four cylinders. For example, the middle cylinder and the rear cylinder may be integrally formed, or the first attachment may be dividable into five or more cylinders. Cylinders other than the flexible hose may be axially split (longitudinally split).

The connection cylinder may include a plug that can close the connection cylinder. With the plug closing the connection cylinder, the first attachment is usable as a separate dust collection cup.

Modifications common to the first to fourth embodiments will now be described. In the second attachment, the connector of the flexible hose may be located in another portion such as the upper surface and the side surface of the casing instead of the front surface of the casing.

The structure for attaching the second attachment to the hammer drill is not limited to the above embodiments. For example, the engagement recess may be replaced with an engagement protrusion, and the corresponding engagement protrusion may be replaced with an engagement recess. The engagement groove may be replaced with an engagement protrusion, and the corresponding engagement protrusion may be replaced with an engagement groove. The number of engagement portions and their arrangement are also changeable. In the coupling between the rotational shaft and the fan shaft, the coupling groove may also be replaced with a coupling protrusion, and the corresponding coupling protrusion may be replaced with a coupling groove. Another coupling structure may be used. The fan shaft may be connected to a rotational shaft other than the motor shaft.

The casing is not limited to the structure of being attached to the hammer drill through relative movement in the vertical direction. The casing may be, for example, attached to the hammer drill through relative movement in the front-rear or lateral direction. The structure of the casing is also modifiable as appropriate.

The location and the structure of the dust box are also not limited to the above embodiments. For example, the dust box may not include a vibrator, or may have a cyclone structure with no filter. The dust collection path is also modifiable as appropriate.

In the above embodiments, the fan shaft is connected to the rotational shaft for power, but the casing may accommodate a dust collection motor and power the dust collection motor from the hammer drill. The casing may accommodate a battery.

In the hammer drill, the rotational shaft may be accommodated to be inclined to the vertical direction. The housing structure is also modifiable as appropriate.

The hammer drill may be a direct-current (DC) machine powered by a battery instead of an alternating-current (AC) machine.

The power tool is not limited to a hammer drill, but another power tool such as an electric hammer may also be included in a dust collection system in combination with the first and second attachments in the embodiments of the present disclosure.

REFERENCE SIGNS LIST 1 hammer drill
2 inner housing
3 motor housing
4 outer housing
5 handle housing
6 lower housing
7 striking assembly
8 motor
9 rotational shaft
12 engagement recess
13 receiving surface
21 engagement groove
22 receiving groove
30 coupling groove
35 tool holder
45 piston
49 striker
50 impact bolt
55, 55A to 55C first dust collection attachment 56 front cylinder
57 middle cylinder
58 rear cylinder
59 connection cylinder
65 rubber seal
67, 115 flexible hose
68 wire
70 second dust collection attachment
71 casing
75 dust box
76 engagement protrusion
77 stopper
79 locking portion
90 fan chamber
91 fan shaft
93 coupling protrusion
94 dust collection fan
100 side plate
101 rib
102 engagement ridge
R dust collection path
S dust collection system for power tool

What is claimed is:

1. A dust collection system for a power tool, the system comprising:
    a power tool (i) configured to receive a tip tool protruding frontward and (ii) including a tool body;
    a first dust collection attachment that is (i) cylindrical and (iii) configured to (a) be attachable to the tool body and (b) cover the tip tool over an entire circumference of the tip tool when the first dust collection attachment is attached to the tool body and the tip tool is received by the power tool;
    a second dust collection attachment (i) configured to be attachable to the tool body and (ii) including a dust collector and dust collection fan configured to receive power from the power tool; and
    a flexible hose (i) that connects the first dust collection attachment and the second dust collection attachment when the first dust collection attachment and the second dust collection attachment are attached to the power tool and (ii) configured to collect dust sucked through the first dust collection attachment into the dust collector in the second dust collection attachment, wherein:
    the dust collection fan includes a fan shaft;
    the power tool includes a motor including a rotational shaft in the tool body; and
    when the second dust collection attachment is attached to the tool body, the fan shaft is connected to a lower end of the rotational shaft that is drivable and rotatable by the motor to supply power to the dust collection fan.

2. The dust collection system according to claim 1, wherein
    the first dust collection attachment includes a connector that is (i) configured to be connectable to the flexible hose and (ii) in a front portion of the first dust collection attachment.

3. The dust collection system according to claim 1, wherein
    the first dust collection attachment includes a connector that is (i) configured to be connectable to the flexible hose and (ii) in a rear portion of the first dust collection attachment.

4. The dust collection system according to claim 1, wherein
    the first dust collection attachment is axially extendable and retractable.

5. The dust collection system according to claim 4, wherein
    the first dust collection attachment includes a bellows-like portion including a spiral wire.

6. The dust collection system according to claim 1, wherein
    the flexible hose is urged to axially contract.

7. The dust collection system according to claim 2, wherein
    the front portion is stiffer than a rear portion of the first dust collection attachment.

8. The dust collection system according to claim 1, further comprising:
    a seal at a front end of the first dust collection attachment and configured to form a seal between a workpiece and the first dust collection attachment upon contact of the seal with the workpiece.

9. The dust collection system according to claim 2, wherein
    the first dust collection attachment is axially extendable and retractable.

10. The dust collection system according to claim 3, wherein
    the first dust collection attachment is axially extendable and retractable.

11. The dust collection system according to claim 9, wherein
    the first dust collection attachment includes a bellows-like portion including a spiral wire.

12. The dust collection system according to claim 10, wherein
    the first dust collection attachment includes a bellows-like portion including a spiral wire.

13. The dust collection system according to claim 2, wherein
    the flexible hose is urged to axially contract.

14. The dust collection system according to claim 3, wherein
    the flexible hose is urged to axially contract.

15. The dust collection system according to claim 4, wherein
    the flexible hose is urged to axially contract.

16. The dust collection system according to claim 5, wherein
    the flexible hose is urged to axially contract.

17. The dust collection system according to claim 2, further comprising:
    a seal at a front end of the first dust collection attachment and configured to form a seal between a workpiece and the first dust collection attachment upon contact of the seal with the workpiece.

18. The dust collection system according to claim 3, further comprising:
    a seal at a front end of the first dust collection attachment and configured to form a seal between a workpiece and the first dust collection attachment upon contact of the seal with the workpiece.

* * * * *